3,120,548
METHOD FOR THE PRODUCTION OF $\Delta^4$-3,17-DI-KETOSTEROIDS AND INTERMEDIATES OBTAINED THEREIN
Alberto Ercoli, Via Circo 12, Milan, Italy, and Rinaldo Gardi, Via Garibaldi 4, Carate, Brianza, Italy
No Drawing. Filed Apr. 30, 1962, Ser. No. 191,321
Claims priority, application Italy Apr. 28, 1961
12 Claims. (Cl. 260—397.4)

This invention relates to a method for converting 3-enolether of $\Delta^4$-3,20-diketosteroid of the pregnane series into the corresponding 3-enolether of $\Delta^4$-3-keto compound of the androstane series and to novel and useful intermediates obtained in said conversion.

It is known that several enolethers of physiologically active $\Delta^4$-3-ketosteroids of the pregnane and androstane series show more potent hormonal activity than the corresponding parent compounds. The methods already known in the art for the preparation of these enol derivatives involve the formation of the $\Delta^4$-3-ketones of the pregnane and androstane series and the reaction of the ketone itself with a lower alkyl orthoformate and/or with the appropriate alcohol.

It is also known that methods have been developed for the production of $\Delta^4$-3-ketones of the pregnane series and that an efficient route to obtain the $\Delta^4$-3-ketones of the androstane series is to derive these compounds from 20-ketosteroids, for example, by means of Beckmann rearrangement. This method consists in reacting a 20-ketoderivative of the pregnane series with hydroxylamine hydrochloride and in subjecting the so-formed 20-ketooxime to the action of phosphorus oxychloride in order to obtain the corresponding 17-ketosteroids of the androstane series.

Examples of the application of the Beckmann rearrangement are described in the literature for the conversion of 3$\beta$-acetoxy-$\Delta^5$-20-ketopregnene, 3$\beta$-acetoxy-17$\alpha$-hydroxy$\Delta^5$-20-ketopregnene or 3$\beta$-acetoxy-$\Delta^{5,16}$-20-ketopregnadiene into the corresponding 3$\beta$-acetoxy-17-keto$\Delta^5$-androstene. It results from the examples cited in art that the conversion can be accomplished only on 20-ketones free from other reactive functional groups in the steroidal nucleus, such as a 3-acetoxy-20-ketosteroid, but the reaction cannot be applied, in any way, to $\Delta^4$-3,20 diketones because of the presence of the reactive ketogroup in 3-position.

For this reason, the production of $\Delta^4$-3-ketoandrostenes from the material of the Beckmann rearrangement requires additional steps in order to convert the $\Delta^5$-3$\beta$-acetoxy grouping into the corresponding $\Delta^4$-3-ketogroup necessary for the enol-etherification reaction.

It has now been found that the enolethers of $\Delta^4$-3-ketones of the androstane series can be directly obtained with high yields from the corresponding enolethers of $\Delta^4$-3,20-diketo steroids of the pregnane series by reacting said 3-enolethers of $\Delta^4$-3,20-diketones at first with hydroxylamine under appropriate conditions in order not to affect the enolether group at the 3-position and then reacting the intermediate 20-ketooximes of the 3-enolethers with a phosphorus halide to form the corresponding 3-enolethers of $\Delta^4$-3-ketoandrostenes.

The method of this invention and the novel intermediates produced therein may be represented by the following formulas:

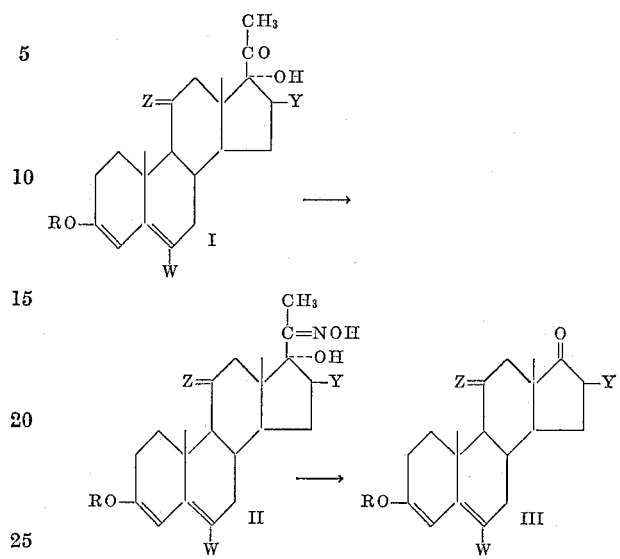

wherein R represents an aliphatic hydrocarbon radical containing from 1 to 7 carbon atoms, inclusive or a cycloaliphatic hydrocarbon radical from 5 to 6 carbon atoms, Y is hydrogen, an $\alpha$- or $\beta$-methyl group or a lower $\alpha$-acyloxy group containing from 1 to 3 carbon atoms in the acyl radical, W is hydrogen, fluorine or chlorine, or methyl, Z is hydrogen or ketonic oxygen and wherein no more than one of the substituents Y, W and Z is other than hydrogen.

The 3-enolethers of $\Delta^4$-3,20-diketopregnenes, starting materials, can be easily prepared according to known procedures by treatment of the chosen $\Delta^4$-3,20-diketosteroid with a lower alkyl orthoformate or with an excess of the desired alcohol in the presence of an acid catalyst and in solution in a solvent capable of removing in the azeotropic mixture the water which formed during the reaction.

Alternatively, the starting material can be obtained by treatment of a preformed methyl or ethyl enolether of a $\Delta^4$-3,20-diketopregnene with the appropriate higher aliphatic or cycloaliphatic alcohol according to an exchange reaction, as disclosed in the U. S. Patent No. 3,019,241.

In carrying out the method of this invention, the starting enolether of a $\Delta^4$-3,20-diketosteroid of Formula I above is treated with an organic acid addition salt of hydroxylamine, particularly acetate or benzoate, in the presence of an organic base such as pyridine, piperidine, ethanolamine or a dialkylamine at a temperature from about 40 to about 80° C. The simultaneous action of the organic base and the organic acid addition salt of hydroxylamine makes possible the obtaining of the 20-ketooximes of the 3-enolethers of Formula II with yields superior to 90% of the theoretical. The conventional procedure for the oximation of a 3$\beta$-acetoxy-20-keto$\Delta^5$-pregnene, based on the use of hydroxylamine hydrochloride and pyridine, or hydroxylamine acetate alone, are not suitable for the preparation of the 20-ketooximes of the 3-enolethers, because they also lead to the formation of 3,20-diketooximes.

For the Beckmann rearrangement, the 3-enolether of the 20-ketooxime is reacted, under very mild conditions, with a reagent selected from phosphorus pentachloride, phosporus oxychloride and benzenesulfonyl chloride, in pyridine solution, at a temperature below room temperature and preferably from about 0° to about 10° C., for a period from two to four hours. Instead of using the pyridine alone, as reaction solvent, a mixture of pyridine and chloroform or pyridine and carbon tetrachloride can be employed. The desired enolether of 3,17-diketosteroid is then isolated from the reaction mixture by addition of slightly alkaline ice-water and crystallization of the separated product in the usual manner.

The 3-enolethers of $\Delta^4$-3,17-diketoandrostenes, obtained according to the process of this invention, can give by acid hydrolysis the corresponding free $\Delta^4$-3-ketones, but in general the enol derivatives of Formula III are further reacted and converted by simple procedures into corresponding biologically active enolethers of other $\Delta^4$-3-ketoandrostene compounds.

For example, the 3-enolethers of androstendione (Formula III where Y, W and Z are hydrogen) by treatment with methyl magnesium halide Grignard reagent yield the corresponding enolethers of 17α-methyltestosterone which have proved to possess marked androgenic and anabolic properties, as disclosed in the copending U.S. application Serial No. 26,715, filed on May 4, 1960, now abandoned.

Similarly, the enolethers of 6-chloro$\Delta^4$-androstendione are treated with a methyl magnesium halide, as disclosed in the copending U.S. application Serial No. 26,713, filed on May 4, 1960, now U.S. Patent No. 3,053,735, and converted into the corresponding enolethers of 6-chloro 17α-methyltestosterone, which compounds show interesting anabolic properties.

Furthermore, the 3-enolethers of 16α- and 16β-methyl androstendione, which are new steroid compounds, can be converted by normal reduction methods, for instance by treatment with lithium-aluminum hydride or sodium borohydride, into the corresponding enolethers of 16α- and 16β-methyl testosterone, thus providing useful androgenic and anabolic agents.

Other $\Delta^4$-3-ketoandrostenes, 3-enolethers obtained according to the process of this invention can be used for the preparation of $\Delta^4$-3-keto hormones, not easily accessible by chemical synthesis, such as 16α-hydroxy testosterone which, on the contrary, can be promptly obtained by reduction with lithium-aluminum hydride of the 3-enolethers of 16α-acetoxy androstendione (Formula III above where Y is an acetoxy group and W and Z are hydrogen), followed by acid hydrolysis of the corresponding 3-enolethers of 16α-hydroxy testosterone.

The 3-enolethers of the $\Delta^4$-3,20-diketopregnene 20-oximes, used as intermediates for the production of the enol derivatives of the $\Delta^4$-3-ketoandrostenes according to the method of this invention, are also useful for the preparation of the $\Delta^4$-3,20-diketopregnene 20-oximes which compounds are obtained from the corresponding 3-enolethers by mild hydrolysis with alcoholic-hydrochloric acid, thus providing a method for the preparation of 20-monooximes of $\Delta^4$-3,20-diketosteroids.

The method of this invention and the preparation of the new steroid derivatives are illustrated in detail by the following examples:

Example 1

1 g. of 3-ethyl-enolether of 17α-hydroxyprogesterone (prepared by treatment of 17α-hydroxyprogesterone with ethylorthoformate and p. toluensulfonic acid) suspended in 1 cc. of pyridine is treated with 3 cc. of 95% ethanol solution of hydroxylamine acetate prepared by reacting 375 mg. of hydroxylamine hydrochloride and 750 mg. of sodium acetate. The mixture is heated to reflux for two hours, then cooled. The product which separates off is filtered, thus obtaining 830 mg. of raw material, M. Pt. 227–230° C. By diluting with water a further 160 mg. separate off, M. Pt. 220–222° C. (total yield 95%). Two recrystallizations from methanol yield the ethyl-enolether of 17α-hydroxyprogesterone-20-oxime in the pure state, M. Pt. 231–232.5° C.; $[\alpha]_D = -142°$ (dioxan).

A solution of 0.85 cc. of phosphorus oxychloride in 3 cc. of pyridine is added, at 0° C., to 260 mg. of oxime, prepared as above described, dissolved in pyridine (3 cc.). After standing 3 hours, the reaction mixture is poured into ice-water containing 6 g. of sodium bicarbonate, and the solution filtered. After crystallization from methanol, 160 mg. of 3-ethyl enolether of the androstendione (yield 74%) are obtained, M. Pt. 150–152° C.; $[\alpha]_D = -87°$ (dioxan).

Example 2

10 g. of 3-ethyl-enolether of 17α-hydroxyprogesterone are treated in benzene solution with 20 cc. of n. amyl alcohol and 30 mg. of p. toluensulfonic acid and the mixture distilled to give as residue the n. amyl enolether of 17α-hydroxyprogesterone. 6 g. of this product, melting at 102–104° C., is heated to reflux with 4 cc. of pyridine and 15 cc. of a solution of hydroxylamine acetate in 95% ethanol. After two hours the mixture is cooled and the 3-n. amyl enolether of 17α-hydroxyprogesterone 20-oxime which separates is collected by filtration.

By treating the 20-oxime-3-enolether with phosphorus oxychloride as in Example 1 there is obtained the n. amyl enolether of $\Delta^4$-androsten-3,17-dione which, after recrystallization from methanol, melts at 104–106° C.; $[\alpha]_D = -78°$ (dioxan).

Example 3

5 g. of n. hexyl enolether of 17α-hydroxyprogesterone (prepared by treatment of the corresponding ethyl enolether with n. hexyl alcohol as in Example 2) is reacted with hydroxylamine acetate and pyridine in 95% ethanol solution. The reaction mixture is refluxed for 1 hour approximately, then cooled and the residue, consisting of n. hexyl enolether of 17α-hydroxyprogesterone 20-oxime, is collected. By performing the Beckmann rearrangement on the above compound, as described in Example 1, the n. hexyl enolether of androstendinone is obtained, M. Pt. 85–87° C.; $[\alpha]_D = -73°$ (dioxan).

Example 4

To a pyridine suspension of 3 g. of n. heptyl enolether of 17α-hydroxyprogesterone (prepared from the corresponding ethyl enolether by treatment with n. heptyl alcohol) is added a solution of hydroxylamine acetate in 95% ethanol and the mixture heated to reflux for two hours. After cooling, a solid product precipitates consisting of 3 n. heptyl enolether of 17α-hydroxyprogesterone-20-oxime. The compound is reacted in pyridine solution with phosphorus pentachloride at a temperature of +5° C. for one hour. The mixture is decomposed with an iced aqueous solution of sodium bicarbonate to give the n. heptyl enolether of androstendione, which recrystallized from methanol melts at 66–67° C.; $[\alpha]_D = -71°$ (dioxan).

Example 5

In the same manner as described in Example 4, 2 g. of (4-methyl)pentyl enolether of 17α-hydroxyprogesterone is reacted with hydroxylamine acetate and pyridine to form the (4-methyl)pentyl enolether of 17α-hydroxyprogesterone-20-oxime.

The product is converted as in Example 1 to (4-methyl) pentyl enolether of androstendione, M. Pt. 119–121° C.; $[\alpha]_D = -67°$ (dioxan).

Example 6

1.5 g. of cyclohexyl-enolether of 17α-hydroxyprogesterone (prepared by treatment of 17α-hydroxyprogesterone with cyclohexanol and p. toluensulfonic acid in benzene solution) are treated with pyridine and hydroxylamine acetate in methanol solution. By working as in Example 1, the 20-oxime of the cyclohexyl enolether of 17α-hydroxyprogesterone separates off.

The product is reacted with phosphorus oxychloride to give the cyclohexyl of androstendione, M. Pt. 163–165° C; $[\alpha]_D = -79°$ (dioxan).

Example 7

10 g. of ethyl-enolether of 16α-acetoxy-17α-hydroxyprogesterone, M. Pt. 229–230° C. (prepared by treating the 61α-acetoxy-17α-hydroxyprogesterone with ethyl-orthoformate and p. toluensulfonic acid) are treated in pyridine with a solution of hydroxylamine acetate in 95% ethanol and the mixture heated to reflux for 30 minutes. After an hour, upon addition of few drops of water and cooling, 5 g. (yield 96%) of raw oxime separates off, M. Pt. 197–204° C.

By recrystallization from methylene chloride-methanol, with a drop of pyridine, the 20-oxime of ethyl enolether of 16α-acetoxy-17α-hydroxyprogesterone melting at 207–208° C.; $[\alpha]_D = -170°$ (dioxan) is obtained. In the same manner the 20-oxime of propyl-enolether of 16α-acetoxy-17α-hydroxyprogesterone and the 20-oxime of n. amyl enolether of 16α-acetoxy-17α-hydroxyprogesterone are prepared.

3.5 g. of 20-oxime of ethyl enolether of 16α-acetoxy-17α-hydroxyprogesterone, prepared as described above, dissolved in pyridine (40 cc.) are treated, at 0° C., with a solution of 11.4 cc. of phosphorus oxychloride in 40 cc. of pyridine. After standing for 3 hours at 0° C., the reaction mixture is poured into ice-water containing 78 g. of sodium bicarbonate and the solution is filtered. Two crystallizations from methanol yield, in the pure state, 2.75 g. (yield 91%) of 3-ethyl enolether of 16α-acetoxy-$\Delta^4$-androsten-3,17-dione, M. Pt. 154–155° C.; $[\alpha]_D = -95°$ (dioxan). A solution of this product in 25 cc. of tetrahydrofurane and 25 cc. of anhydrous ether is added slowly to a suspension of 1 g. of lithium-aluminium hydride in 50 cc. of anhydrous ether. The mixture is stirred for two hours at room temperature. The excess of hydride is destroyed with ethyl acetate and the alcoholates decomposed by addition of a few cubic centimeters of a solution saturated with sodium sulfate. A further amount of anhydrous sodium sulfate is added and the mass is extracted several times with sulfuric ether.

The ethereal extract is collected, washed with water and dried by evaporation, thus obtaining 960 mg. of ethyl enolether of 16α-hydroxytestosterone (yield 83%). A sample recrystallized from a small volume of methanol shows at M. Pt. 202–203.5° C.; $[\alpha]_D = -150°$ (dioxan). 300 mg. of the enolether is heated with 0.1 cc. of 2 N sulfuric acid and the mixture is then diluted with water to give 260 mg. of 16α-hydroxytestosterone, which recrystallized from ethyl acetate melts at 192–193° C.; $[\alpha]_D = +80°$ (chloroform).

Example 8

To 1.5 g. of cyclopentyl-enolether of 16α-acetoxy-17α-hydroxyprogesterone, M. Pt. 256° C. (prepared from the corresponding ethyl enolether by treatment with cyclopentanol), there is added 2 cc. of pyridine and a solution of hydroxylamine benzoate in 95% ethanol. After heating to about 60° C. and cooling, the cyclopentyl-enolether of 16α-acetoxy-17α-hydroxyprogesterone-20-oxime is collected and treated with phosphorus oxychloride as described in Example 1. The resulting product consists of the cyclopentyl-enolether of 16α-acetoxy-$\Delta^4$-androsten-3,17-dione. 1 g. of the thus obtained compound in 40 cc. of methanol is treated with an aqueous solution of 10% potassium bicarbonate and the mixture refluxed for 10 minutes. Most of the solvent is eliminated under vacuum and the residue, recrystallized from methanol yields the cyclopentyl-enolether of 16α-hydroxy-androstendione.

Example 9

A mixture of 3 g. of 3-ethyl-enolether of 17α-hydroxy-11-ketoprogesterone, M. Pt. 137–140° C. (prepared by treatment of the 17α-hydroxy-11-ketoprogesterone with ethyl orthoformate and p. toluensulfonic acid), 6.5 cc. of piperidine and 5 g. of hydroxylamine acetate in 90 cc. of methanol is refluxed for 1 hour. The liquid is evaporated in vacuo and the solid residue recrystallized from methanol to give 3-ethyl-enolether of 17α-hydroxy-11-ketoprogesterone-20-oxime, M. Pt. 212–214° C.; $[\alpha]_D = -69°$ (dioxan). Following the same procedure as above, the butyl enolether of 17α-hydroxy-11-ketoprogesterone-20-oxime and the n. amyl enolether of 17α-hydroxy-11-ketoprogesterone are obtained.

A solution of 1.5 g. of the 20-ketooxime of ethyl enolether of 17α-hydroxy-11-ketoprogesterone, above described, in 18 cc. of anhydrous pyridine, after cooling at 0° C. is added to a mixture of phosphorus oxychloride (4.7 cc.) in 17 cc. of pyridine. The reaction mixture is allowed to stand for 3 hours at 0° C., then poured into 500 cc. of water containing 38 g. of sodium bicarbonate. A solid separates which filtered and crystallized from methanol gives 3-ethyl enolether of adrenosterone, M. Pt. 130–131° C.; $[\alpha]_D = -9°$ (dioxan).

Example 10

2.5 g. of n. hexyl enolether of 17α-hydroxy-11-ketoprogesterone (obtained from the corresponding ethyl enolether by treatment with n. hexyl alcohol) are worked as in Example 9 to give n. hexyl enolether of 17α-hydroxy-11-ketoprogesterone-20-oxime. Similarly, the 20-oxime of cyclopentyl enolether of 17α-hydroxy-11-ketoprogesterone is prepared. This compound is reacted with phosphorus oxychloride as in the foregoing example to give the cyclopentyl-enolether of adrenosterone.

Example 11

1 g. of methyl-enolether of 6-chloro-17α-hydroxyprogesterone (obtained by reacting the 6-chloro-17α-hydroxyprogesterone with methyl-orthoformate and p-toluensulfonic acid) is dissolved in 1 cc. of pyridine and there is added 5 cc. of a solution of hydroxylamine acetate in 95% ethanol. After heating to reflux for an hour and cooling, the 20-oxime of the methyl-enolether of 6-chloro 17α-hydroxyprogesterone separates off. Following the same procedure as above the n. hexyl-enolether of 6-chloro-17α-hydroxyprogesterone-20-oxime and the n. heptyl-enolether of 6-chloro-17α-hydroxyprogesterone-20-oxime are obtained.

Example 12

4 g. of cyclopentyl-enolether of 6-chloro-17α-hydroxyprogesterone (obtained by exchange reaction between the corresponding methyl-enolether and cyclopentyl alcohol) are treated as in Example 11 to give the cyclopentyl enolether of 6-chloro-17α-hydroxyprogesterone-20-oxime. To 200 mg. of the 20-oxime in pyridine, a solution of benzensulfonyl chloride in pyridine is added. The mixture is allowed to stand for three hours at 10° C., then poured into ice-water containing sodium bicarbonate and the solution filtered. After crystallization from methanol the cyclopentyl-enolether of 6-chloro-androstendione, M. Pt. 179–180°, is obtained.

Example 13

2 g. of ethyl-enolether of 6-fluoro-17α-hydroxyprogesterone (prepared by treatment of 6-fluoro-17α-hydroxyprogesterone with ethyl-orthoformate and p-toluensulfonic acid) are worked as in the foregoing examples to give the ethyl-enolether of 6-fluoro-17α-hydroxyprogesterone-20-oxime. The treatment of the 20-oxime with phosphorus pentachloride in pyridine provides the ethyl enolether of 6-fluoro-androstendione, M. Pt. 142–143° C. In the same manner, the n. hexyl enolether of 6-fluoro-17α-hydroxyprogesterone (obtained by exchange reaction between the corresponding ethyl enolether and n. hexyl alcohol) is converted into the corresponding 20-oxime which reacted with phosphorus pentachloride as above gives the n. hexyl enolether of 6-fluoro-androstendione, M. Pt. 98–100° C.

Example 14

A mixture of 3 g. of cyclopentyl enolether of 6-methyl-17α-hydroxyprogesterone (prepared from the corresponding ethyl enolether by treatment with cyclopentyl alcohol), 3 cc. of ethanolamine and 5 cc. of hydroxylamine acetate methanol solution is refluxed for 1 hour, then cooled. The cyclopentyl enolether of 6-methyl-17α-hydroxyprogesterone-20-oxime which separates off is collected and treated with phosphorus oxychloride in pyridine solution to give the corresponding cyclopentyl enolether of 6-methyl-androstendione.

Example 15

16α-methyl-17α-hydroxyprogesterone (obtained by acid hydrolysis of the corresponding 17α-acetoxy derivative prepared as described in J. Org. Chem. 26, 876, 1961) is treated with ethyl orthoformate and p. toluensulfonic acid to give the ethyl enolether. The enol derivative is treated with hydroxylamine acetate and pyridine as in Example 1 to form the corresponding 20-oxime. The product gives, by treatment with benzenesulfonyl chloride as disclosed in Example 11, the ethyl enolether of 16α-methyl-androstendione.

Following the procedure as above and substituting the ethyl enolether by the cyclopentyl enolether of 16α-methyl-17α-hydroxyprogesterone, the 20-oxime of cyclopentyl enolether of 16α-methyl-17α-hydroxyprogesterone is first obtained which, by reacting with benzensulfonyl chloride, gives the cyclopentyl enolether of 16α-methyl androstendione.

Example 16

16β - methyl - 17α - hydroxyprogesterone (obtained by acid hydrolysis of the corresponding 17α-acetoxy derivative prepared as described in Gaz. Chem. It. 91, 569, 1961) is treated with ethylorthoformate and p. toluensulfonic acid to prepare the ethyl enolether of 16β-methyl-17α-hydroxyprogesterone. A mixture of 680 mg. of the thus provided ethyl enolether, 3 cc. of pyridine and 21.5 cc. of ethanol containing 1.2 g. of hydroxylamine acetate are refluxed for 1 hour and 15 minutes and the solvent is evaporated in vacuo. The residue is taken up with aqueous methanol, and, after filtration, recrystallized from methanol to give the ethyl enolether of 16β-methyl-17α-hydroxyprogesterone-20-oxime. Into a solution of 0.24 cc. of phosphorus oxychloride in 0.9 cc. of chloroform, cooled to 0° C., there is added dropwise at a temperature of from 0° C. to 3° C., a mixture of 0.5 cc. of pyridine and 0.6 cc. of chloroform. Then 110 mg. of ethyl enolether of 16β-methyl-17α-hydroxyprogesterone-20-oxime dissolved in 1.5 cc. of chloroform are added and the mixture allowed to stand for 6 hours at 0° C. and poured into water. The aqueous layer is extracted twice by chloroform and the remaining phase is washed with a solution of sodium bicarbonate and water to neutrality. By evaporating the solvent in vacuo, an oily residue is obtained which is heated to reflux for 1 hour with 5 cc. of 5% potassium bicarbonate in ethanol. The solvent is then eliminated and the residue taken up with water to give the ethyl enolether of 16β-methyl-androstendione.

Example 17

300 mg. of the 3-ethyl enolether of 17α-hydroxyprogesterone-20-oxime, prepared as in Example 1 are heated for ten minutes with 0.1 cc. of dilute hydrochloric acid in 10 cc. of methanol. By diluting the mixture with water, there are obtained 200 mg. of 17α-hydroxyprogesterone-20-oxime melting at 259–261° C.; $[\alpha]_D = +78°$ (dioxan).

Example 18

The 3-ethyl enolether of 16α-acetoxy-17α-hydroxyprogesterone-20-oxime, prepared as described in Example 7, is heated to 60° C. for a few minutes with hydrochloric acid in methanol to give the 20-oxime of 16α-acetoxy-17α-hydroxyprogesterone.

We claim:
1. A method for the preparation of a steroid compound of the formula:

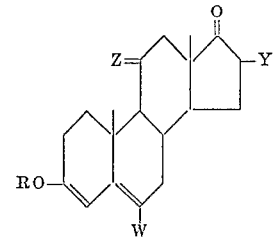

where R is selected from the group consisting of aliphatic hydrocarbon radicals containing from 1 to 7 carbon atoms, inclusive, and cycloaliphatic hydrocarbon radicals containing from 5 to 6 carbon atoms, Y is selected from the group consisting of hydrogen, α-methyl group, β-methyl group and α-acyloxy group containing from 1 to 3 carbon atoms in the acyl radical, W is selected from the group consisting of hydrogen, fluorine and chlorine and methyl, Z is selected from the group consisting of hydrogen and oxygen and wherein no more than one of the substituents Y, W and Z is other than hydrogen, which comprises reacting a steroid compound of the formula:

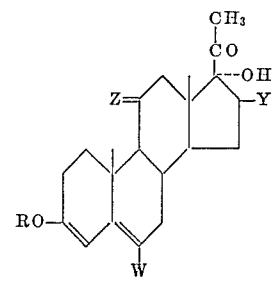

where R, Y, W and Z are as defined above, with an organic acid addition salt of hydroxylamine selected from the group consisting of acetate and benzoate and with an organic base selected from the group consisting of pyridine, piperidine and ethanolamine and reacting the 20-keto-oxime formed, having the formula:

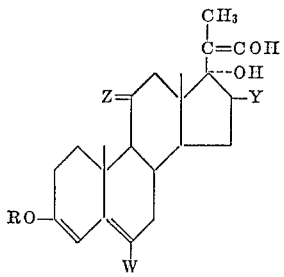

where R, Y, W and Z are as defined above, with a reagent selected from the group consisting of phosphorus, pentachloride, phosphorus oxychloride and benzensulfonyl chloride, in pyridine solution at a temperature from 0 to 10° C.

2. A method for the preparation of a 3,11,17-triketo-Δ⁴-androstene, 3-enolether of formula:

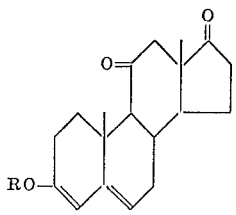

in which R is selected from the group consisting of aliphatic hydrocarbon radicals containing from 1 to 7 carbon atoms, inclusive, and cycloaliphatic hydrocarbon radicals from 5 to 6 carbon atoms which comprises reacting the corresponding 3-enolether of 17α-hydroxy-3,11,20-triketoΔ⁴-pregnene with hydroxylamine acetate and an organic base selected from the group consisting of pyridine, piperidine and ethanolamine to form the 20-oxime of 17α-hydroxy-3,11,20-triketoΔ⁴-pregnene-3-enolether, reacting said 20-oxime product with a reagent selected from the group consisting of phosphorus pentachloride, phosphorus oxychloride and benzensulfonyl chloride in pyridine solution at a temperature from about 0 to about 10° C. to form said androstene 3-enolether.

3. A method for the preparation of a 16α-methyl-Δ⁴-3,17-diketo-androstene, 3-enolether of formula:

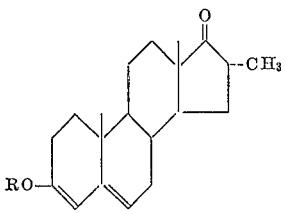

in which R is selected from the group consisting of aliphatic hydrocarbon radicals containing from 1 to 7 carbon atoms, inclusive, and cycloaliphatic hydrocarbon radicals from 5 to 6 carbon atoms which comprises reacting the corresponding 3-enolether of 16α-methyl-17α-hydroxy-Δ⁴-3,20-diketo-pregnene with hydroxylamine acetate and an organic base selected from the group consisting of pyridine, piperidine and ethanolamine to form the 20-oxime of 16α-methyl-17α-hydroxyΔ⁴-3,20-diketo-pregnene 3 - enolether, reacting said 20-oxime product with a reagent selected from the group consisting of phosphorus pentachloride, phosphorus oxychloride and benzensulfonyl chloride in pyridine solution at a temperature from about 0 to about 10° C. to form said 16α-methylΔ⁴-3,17-diketoandrostene-3-enolether.

4. A method for the preparation of a 16β-methyl-Δ⁴-3,17-diketoandrostene, 3-enolether of formula:

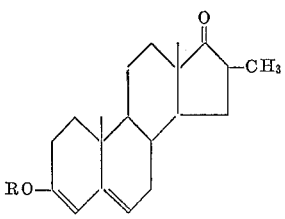

in which R is selected from the group consisting of aliphatic hydrocarbon radicals containing from 1 to 7 carbon atoms, inclusive, and cycloaliphatic hydrocarbon radicals from 5 to 6 carbon atoms which comprises reacting the corresponding 3-enolether of 16β-methyl-17α-hydroxy-Δ⁴-3,20-diketopregnene with hydroxylamine acetate and an organic base selected from the group consisting of pyridine, piperidine and ethanolamine to form the 20-oxime of 16β-methyl-17α-hydroxy-Δ⁴-3,20-diketopregnene 3-enolether, reacting said 20-oxime product with a reagent selected from the group consisting of phosphorus pentachloride, phosphorus oxychloride and benzensulfonyl chloride in pyridine solution at a temperature from about 0 to about 10° C. to form said 16β-methyl-Δ⁴-3,17-diketoandrostene 3-enolether.

5. A method for the preparation of 16α-hydroxy testosterone which comprises reacting the 3-enol ethyl ether of 16α,17α-dihydroxy-Δ⁴-3,20-diketopregnene 16-acetate with hydroxylamine acetate and an organic base selected from the group consisting of pyridine, piperidine and ethanolamine to form the 20-oxime of 16α,17α-dihydroxy-Δ⁴-3,20-diketopregnene 16-acetate 3-enol ethyl ether, reacting said 20-oxime product with a reagent selected from the group consisting of phosphorus pentachloride, phosphorus oxychloride and benzensulfonyl chloride in pyridine solution at a temperature from about 0 to about 10° C. to form the 3-enol ethyl ether of 16α-hydroxy-Δ⁴-3,17-diketoandrostene 16-acetate, treating said androstene compound with lithium-aluminum hydride to form the 3-enol ethyl ether of 16α-hydroxy testosterone and hydrolysing with a mineral acid said enol ether to form 16α-hydroxy testosterone.

6. 3-enol ethers of a Δ⁴-3,20-diketopregnene 20-oxime of formula:

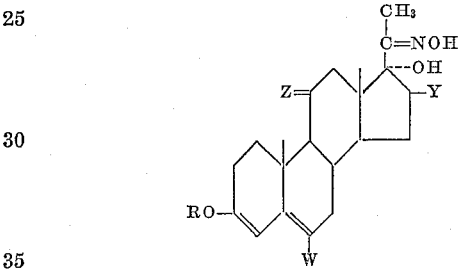

where R is selected from the group consisting of aliphatic hydrocarbon radicals containing from 1 to 7 carbon atoms, inclusive, and cycloaliphatic hydrocarbon radicals containing from 5 to 6 carbon atoms, Y is selected from the group consisting of hydrogen, α-methyl group, β-methyl group and α-acetoxy group containing from 1 to 3 carbon atoms in the acyl radical, W is selected from the group consisting of hydrogen, fluorine and chlorine and methyl, Z is selected from the group consisting of hydrogen and oxygen and wherein no more than one of the substituents Y, W and Z is other than hydrogen.

7. 3-enol ethyl ether of 17α-hydroxy-Δ⁴-3,20-diketopregnene 20-oxime.

8. 3-enol ethyl ether of 16α-methyl-17α-hydroxy-Δ⁴-3,20-diketopregnene 20-oxime.

9. 3-enol ethyl ether of 16β-methyl-17α-hydroxy-Δ⁴-3,20-diketopregnene 20-oxime.

10. 3-enol ethyl ether of 16α-acetoxy-17α-hydroxy-Δ⁴-3,20-diketopregnene 20-oxime.

11. 3-enol ethyl ether of 17α-hydroxy-Δ⁴-3,11,20-triketo-pregnene 20-oxime.

12. 3-enol cyclopentyl ether of 6-chloro-17α-hydroxy-Δ⁴-3,20-diketo-pregnene 20-oxime.

References Cited in the file of this patent

Gardi et al.: Gazz Chim. Ital. (December 1961), pp. 1258–1267.